US010827072B1

(12) United States Patent
Deole et al.

(10) Patent No.: US 10,827,072 B1
(45) Date of Patent: Nov. 3, 2020

(54) IMMEDIATE CALL RECONNECTION TO THE SAME AGENT IN A CONTACT CENTER

(71) Applicant: Avaya Inc., Basking Ridge, NJ (US)

(72) Inventors: Pushkar Deole, Pune (IN); Jibin George, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 16/676,728

(22) Filed: Nov. 7, 2019

(51) Int. Cl.
*H04M 3/523* (2006.01)
*H04M 3/42* (2006.01)
*H04M 3/56* (2006.01)
*H04M 3/51* (2006.01)

(52) U.S. Cl.
CPC ..... *H04M 3/5231* (2013.01); *H04M 3/42059* (2013.01); *H04M 3/5191* (2013.01); *H04M 3/5235* (2013.01); *H04M 3/563* (2013.01)

(58) Field of Classification Search
USPC ......... 379/191, 196, 142.15, 265.11, 265.13, 379/266.01, 266.09
See application file for complete search history.

(56) References Cited

U.S. PATENT DOCUMENTS

| | | | | |
|---|---|---|---|---|
| 7,295,669 | B1 * | 11/2007 | Denton | H04M 3/51 379/265.02 |
| 8,582,750 | B2 * | 11/2013 | Lee | H04M 3/12 379/265.02 |
| 10,135,985 | B1 | 11/2018 | Deole et al. | |

* cited by examiner

*Primary Examiner* — Yosef K Laekemariam

(57) ABSTRACT

The technology disclosed herein enables a call to be immediately reconnected to the same agent of a contact center after the agent has been disconnected while the caller remains connected to the contact center. A method provides determining that a first agent system, operated by a first agent of the contact center, has been disconnected from a communication session between the first agent system and a first caller system, operated by a first caller, due to a non-recoverable error. The first caller system remains connected to the contact center. The method further provides generating identification information that identifies the communication session and generating a link to join the communication session that includes the identification information. The method also provides transferring the link to a second agent system operated by the first agent. The second agent system is connected to the communication session when the second agent system follows the link.

20 Claims, 7 Drawing Sheets

IMMEDIATE CALL RECONNECTION TO THE SAME AGENT IN A CONTACT CENTER

TECHNICAL BACKGROUND

Agents in modern contact centers are able to communicate with customers, or other types of callers, using packet-based technologies and communication protocols, such as Web Real-Time Communications (WebRTC). These technologies allow agents to communicate with callers using communications beyond the typical voice communications that legacy technologies provide, such as video, chat, desktop sharing, etc. Additionally, these technologies allow a contact center to be distributed in nature, which allows the agents to be located anywhere with a network connection, such as their own home. To connect a caller to an agent, the caller may need to answer questions about a call (e.g., via an interactive voice response system (IVR), via a web interface, via a client interface, etc.) and, if no agent is readily available, may be placed in a queue until an agent is available. After being routed to an agent, should the agent become disconnected from the communication with the call, the caller may need to call back, re-answer the previous questions and/or wait in yet another queue before reconnecting with the agent.

SUMMARY

The technology disclosed herein enables a call to be immediately reconnected to the same agent of a contact center after the agent has been disconnected while the caller remains connected. In a particular embodiment, a method provides determining that a first agent system, operated by a first agent of a plurality of agents for the contact center, has been disconnected from a communication session between the first agent system and a first caller system, operated by a first caller, due to a non-recoverable error. The first caller system remains connected to the contact center. The method further provides generating identification information that identifies the communication session and generating a link to join the communication session that includes the identification information. The method also provides transferring the link to a second agent system operated by the first agent. The second agent system is connected to the communication session when the second agent system follows the link.

In some embodiments, the identification information includes a key that is unique to the first agent and a caller identifier that identifies the first caller.

In some embodiments, determining that the first agent system has been disconnected comprises receiving a disconnect notification from a communication server that was facilitating the communication session.

In some embodiments, the method further provides receiving a request from the second agent system in response to the second agent system following the link, wherein the request includes the identification information and, based on the identification information, bypassing an agent login process.

In some embodiments, the method further provides receiving a request from the second agent system in response to the second agent system following the link, wherein the request includes the identification information and providing the second agent system with a web application interface to continue the communication session. In those embodiments, after providing the web application interface, the method may include registering the second agent system with a communication server for facilitating the communication session and notifying a communication routing system that the first agent is available. The communication routing system connects the first caller system to the second agent system via the communication server. Also, in those embodiments, the method may include recording a state of the first agent system prior to being disconnected from the communication session and setting the web application interface to the state.

In some embodiments, determining that the first agent system has been disconnected comprises receiving a disconnect notification message from a communication server that was facilitating the communication session. The disconnect notification indicates the first agent system disconnected due to a recoverable error. Upon the first agent system not recovering within a predetermined period of time, the method includes determining that the first agent system has been disconnected due to a non-recoverable error.

In some embodiments, after determining that the first agent system has been disconnected from the communication session, the method provides presenting a message to the first caller indicating that reconnection of the first agent is being attempted.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to determine that a first agent system, operated by a first agent of a plurality of agents for the contact center, has been disconnected from a communication session between the first agent system and a first caller system, operated by a first caller, due to a non-recoverable error. The first caller system remains connected to the contact center. The program instructions further direct the processing system to generate identification information that identifies the communication session and generate a link to join the communication session. The link includes the identification information. The program instructions also direct the processing system to transfer the link to a second agent system operated by the first agent. The second agent system is connected to the communication session when the second agent system follows the link.

In a further embodiment, another apparatus is provided having one or more computer readable storage media and a processing system operatively coupled with the one or more computer readable storage media. Program instructions stored on the one or more computer readable storage media, when read and executed by the processing system, direct the processing system to facilitate a communication session between a first agent system, operated by a first agent of a plurality of agents for the contact center, and a first caller system, operated by a first caller. The program instructions further direct the processing system to determine that a first agent system has been disconnected from the communication session due to a non-recoverable error. The first caller system remains connected to the contact center. The program instructions also direct the processing system to notify a reconnect system that the first agent system has been disconnected. The reconnect system generates a link to join the communication session that includes identification information that identifies the communication session and transfers the link to a second agent system operated by the first agent. Additionally, the program instructions direct the processing system to connect the second agent system to the communication session when the second agent system follows the link.

DETAILED DESCRIPTION

An agent of a contact center may be disconnected from a caller for any number of reasons, however, the technology described below enables the immediate reconnection of a caller to the same agent to which the caller was communicating when the caller remains connected to a contact center system. For example, an error may occur on the agent's client system that disconnects the agent's client system from the contact center system which facilitates communication sessions between the caller's client system and the agent's client system. In such a circumstance, the caller's client system would remain connected to the contact center system. Therefore, the contact center system to which the call is connected, or another system of the contact center, can reconnect the call to the agent's client system, or another client system operated by the same agent, that connects to the contact center system.

Figure 1:
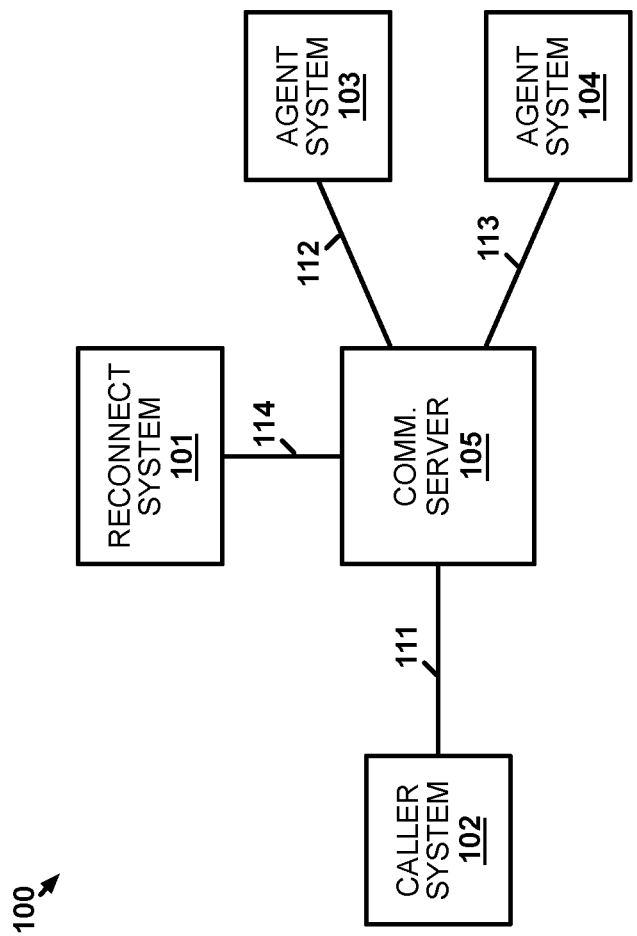
FIG. 1 illustrates an implementation for immediately reconnecting a call to the same agent in a contact center.

FIG. 1 illustrates implementation 100 for immediately reconnecting a call to an agent in a contact center. Implementation 100 includes reconnect system 101, caller client system 102, agent client system 103, agent client system 104, and communication server 105. Communication server 105 and caller client system 102 communicate over communication link 111. Communication server 105 and agent client system 103 communicate over communication link 112. Communication server 105 and agent client system 104 communicate over communication link 113. Reconnect system 101 and communication server 105 communicate over communication link 114. Communication links 111-113 may comprise wireless and/or wired communication links and may include intervening communication networks, systems, and devices. While shown separately, reconnect system 101 and communication server 105 may be combined into a single system or device. Likewise, while each is shown as one device, reconnect system 101 and communication server 105 may be separated into multiple devices.

In operation, communication server 105 operates on behalf of a contact center to facilitate user communications exchanged between caller client systems, such as caller client system 102, and agent client systems, such as agent client system 103 and agent client system 104, that are associated with the contact center. Caller client system 102, agent client system 103, and agent client system 104 may each comprise a phone, tablet, laptop computer, desktop workstation, or some other type of computing device having processing circuitry and communication interface circuitry to exchange the user communications described below. Agents of the contact center, and their respective agent client systems, may be co-located or may be distributed across multiple locations. This example focuses on a single agent associated with both agent client system 103 and agent client system 104. For instance, agent client system 103 may be a desktop computer workstation operated by the agent and agent client system 104 may be a smartphone, tablet, or laptop of the agent. It should be understood that the user communications discussed herein could be voice, video, text chat, or some other mode for user communications between people. Likewise, a communication session may be initiated by a caller or by the contact center. Regardless, once a communication session is connected between caller client system 102 and agent client system 103, reconnect system 101 is able to immediately reconnect the caller to the same agent when the call is dropped by agent client system 103.

Figure 2:
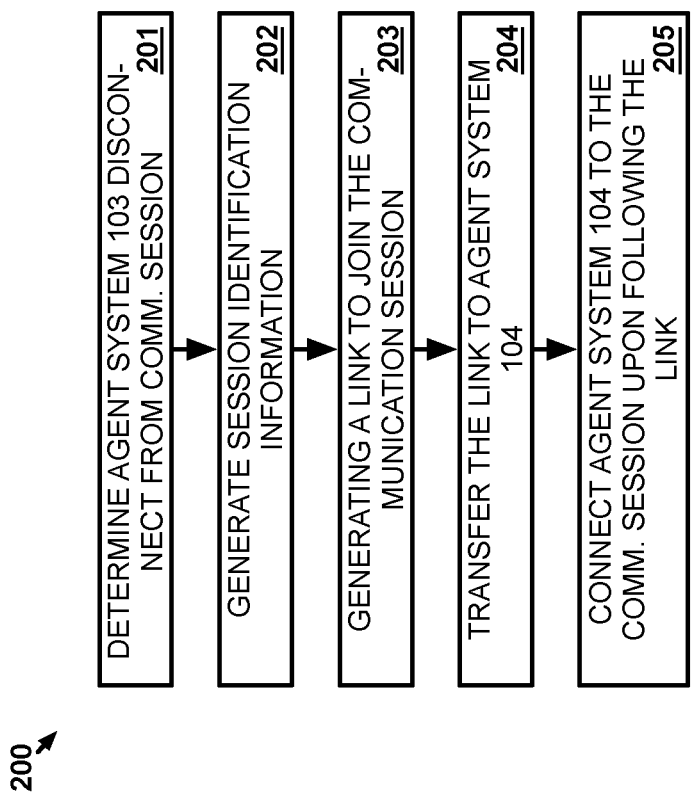
FIG. 2 illustrates an operational scenario to immediately reconnect a call to the same agent in a contact center.

FIG. 2 illustrates operational scenario 200 to immediately reconnect a call to a same agent in a contact center. In operational scenario 200, reconnect system 101 determines that agent system 103, operated by an agent for the contact center, has been disconnected from a communication session between agent client system 103 and caller client system 102, operated by a first caller due to a non-recoverable error (201). While agent client system 103 becomes disconnected, caller client system 102 remains connected to the contact center. In this example, caller client system 102 would remain connected to communication server 105, although, caller client system 102 may remain connected to a different system, such as a call distributor, in other examples.

Reconnect system 101 may be informed by communication server 105 that a non-recoverable error has occurred that caused agent client system 103 to disconnect. A non-recoverable error comprises any other type of error that would not allow for the connection to be recovered relatively quickly. For example, communication link 112 may go down indefinitely, agent client system 103 may crash and require rebooting, agent client system 103 may lose power, or some other type of error may occur that requires agent client system 103 to be disconnected from reconnect system 101 for a longer than desired amount of time (e.g., since reconnect system 101 will attempt to reconnect the call substantially immediately, any error that takes more than a few seconds to cure may be considered a non-recoverable error). In contrast, a recoverable error comprises an error from which agent client system 103 may recover from relatively quickly so as to allow reconnect system 101 to immediately attempt to reconnect the call with agent client system 103 rather than proceeding in accordance with the remaining steps in operational scenario 200. Examples of recoverable errors may include a client software crash on agent client system 103, a web browser crash on agent client system 103 (where the client executes within a browser window), java script errors on agent client system 103, 100% CPU utilization on agent client system 103 do to another program (including malware) that may be executing on agent client system 103, or some other condition that would cause client software executing on agent client system 103 to lose the connection between agent client system 103 and reconnect system 101 but would still allow the connection to be recovered relatively quickly (e.g., by relaunching the client software). When a recoverable error occurs, agent client system 103 may inform reconnect system 101 that the recoverable error occurred and may also inform reconnect system 101 of the type of error and/or an amount of time agent client system 103 may need to recover.

In some examples, reconnect system 101 may first determine that a recoverable error has occurred but, upon a predetermined amount of time elapsing, may reclassify the error as being non-recoverable and proceed in accordance with operational scenario 200 below.

Upon determining that a non-recoverable error has occurred, reconnect system 101 generates identification information that identifies the communication session (202). The identification information is unique to the communication session at least during a predefined time period for which reconnection may occur (e.g., for at least five minutes during which a caller is likely to stay on for reconnection). For example, reconnect system 101 may create an alphanumeric string that reconnect system 101 associates with the communication session. In other examples, the identification information may be generated from information about the communication session, such as the identity of the caller, the identity of the agent, an identifier for caller client system 102, an identifier for agent client system 103, a time of day for the communication session, or any other type of relevant information. In some cases, the information about the communication session may be fed into a transform, such as a hash function or encryption algorithm, that generates a unique string as the identification information for inclusion in the link discussed below. Other manners of generating identification information may also be used as long as the resulting identification information results in information that can be included in the link discussed below.

Reconnect system 101 generates a link to join the communication session and the link includes the identification information (203). The link comprises a uniform resource locator (URL) that directs a system that follows the link to a system that will reconnect the system to the communication session. In this example, the link directs to communication server 105, although, in other examples, the link may direct to reconnect system 101 or some other system that handles the functions necessary to connect the link-following system to the communication session with caller client system 102. The identification information in the link allows communication server 105 to at least differentiate between the communication session that was between caller client system 102 and agent client system 103 (before disconnection) and other communication sessions that may have been disconnected. For example, the identification information may be "commbtw102and103" and the base URL may comprise "www.commsys105.com/reconnect". The completed link generated in this example may, therefore, be "www.commsys105.com/reconnect/commbtw102and103".

Once the link is generated, reconnect system 101 transfers the link to agent client system 104 which is another client system operated by the agent who was a party to the communication session (204). For example, agent client system 103 may be the agent's desktop workstation while agent client system 104 may be the agent's laptop or tablet. The link may be transferred via a proprietary message format to devices running client software for the contact center or may be transferred via some other messaging format, such as short message service (SMS), email, instant messaging, or some other communication format capable of carrying links. In some examples, the link alone may be sent while other examples may include a message along with the link, such as a message that directs the recipient to select the link to reconnect to the communication session.

The link may be transferred specifically to agent client system 104 or may be transferred to multiple agent client systems associated with the agent of agent client system 103. For example, sending the link in an email to the agent's email account may allow the email message containing the link to be accessed by any system having access to that email account. If a particular system receiving the link is not allowed to be connected to the communication session, does not have the capabilities required for connection for the communication session, or is otherwise prevented from being connected to the communication session, then that system may receive a notification that the link could not be followed. In some examples, reconnect system 101 may include a database of alternate client systems, such as agent client system 104, to which the link should be sent. For instance, the agent may register agent client system 104, and any other system the agent wishes to be included in the database, so that reconnect system 101 is aware of agent client system 104.

When agent client system 104 follows the link from reconnect system 101, agent client system 104 is connected to the communication session (205). In this example, since the link directs to communication server 105, communication server 105 extracts the identification information in the link (i.e., "commbtw102and103" from the above example) and determines that agent client system should be connected to caller client system 102. Communication server 105 then connects agent client system 104 to caller client system 102 accordingly. In some examples, the agent may select the link via a user interface of agent client system 104 while, in other examples, agent client system 104 may be configured to automatically recognize that the link was received and follow the link itself. In either case, the agent may not be able to participate in the communication session with the caller until agent client system 104's security checks (e.g., username/password, biometric identification, etc.) have been passed. In other words, reconnect system 101 may presume that the agent associated with the link is the one operating agent client system 104 and allow agent client system 104 bypass an agent login/verification process at either or both of reconnect system 101 and communication server 104. Reconnect system 101 may require agent client system 104 to have one or more security checks for the agent before reconnect system 101 allows agent client system 104 to be an alternate device for the agent.

Advantageously, even if agent client system 103 becomes disconnected from the communication session, the agent can still get back on the communication session in relatively immediate fashion via agent client system 104. The caller at caller client system 102 should not have to wait longer than the time needed for agent client system 104 to receive the link and connect to the communication session (i.e., substantially immediately) before being able to continue the communication session with the agent.

Figure 3:
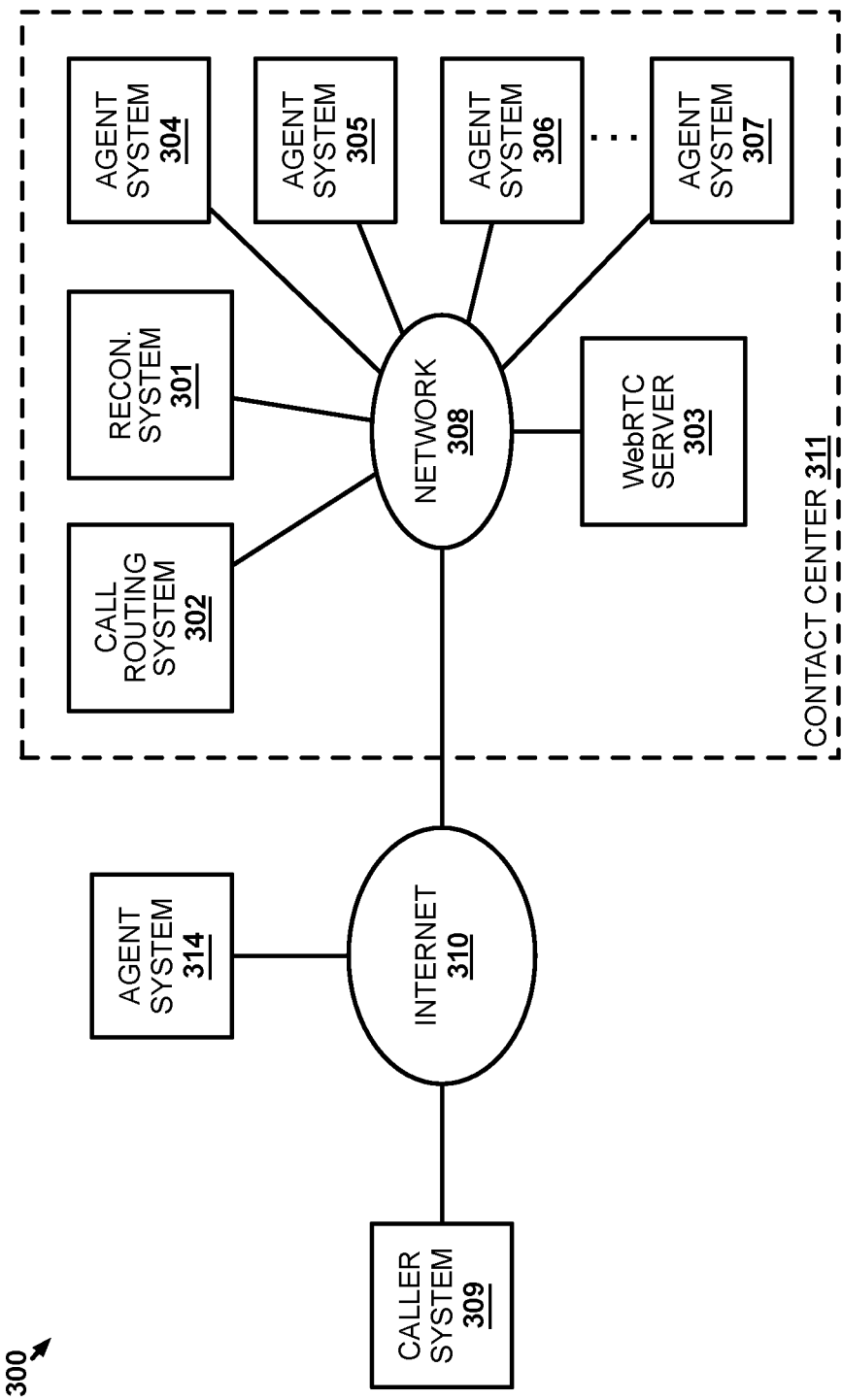
FIG. 3 illustrates another implementation for immediately reconnecting a call to the same agent in a contact center.

FIG. 3 illustrates implementation 300 for immediately reconnecting a call to a same agent in a contact center. Implementation 300 includes reconnect system 301, call routing system 302, WebRTC server 303, agent client system 304, agent client system 305, agent client system 306, agent client system 307, contact center network 308, caller client system 309, Internet 310, and agent client system 314. Although, reconnect system 301, call routing system 302, WebRTC server 303, agent client system 304, agent client system 305, agent client system 306, agent client system 307, contact center network 308 are part of contact center 311, no element of contact center 311 need be co-located with another. As such, contact center network 308 may use Internet 310, and possibly other local area networks, to exchange communications with one or more of reconnect system 301, call routing system 302, WebRTC server 303, agent client system 304, agent client system 305, agent client system 306, and agent client system 307. While only four agent client systems are shown in implementation 300, contact center 311 may include any number of agent client systems.

In this example, WebRTC is used to exchange user communications between client systems and WebRTC server 303 handles the exchange of those communications. Call routing system 302 works with WebRTC server 303 to select to which of agent client system 304, agent client system 305, agent client system 306, and agent client system 307 a call with contact center 311 should be routed. Once selected, call routing system 302 instructs WebRTC server 303 to establish a WebRTC connection with the selected agent client system for user communications to be exchanged. In the examples below, caller client system 309 is also using WebRTC, via a WebRTC client executing thereon, and will have a similar connection to WebRTC server 303 established. However, in other examples, caller client system 309 may connect to contact center 311 in some other manner (e.g., a traditional telephone call) and WebRTC server 303, or some other system of contact center 311, will act as a gateway to the WebRTC connection with the selected agent client system. While shown as distinct devices in contact center 311, in other examples one or more of reconnect system 301, call routing system 302, and WebRTC server 303 may be combined into fewer distinct systems.

Figure 4:
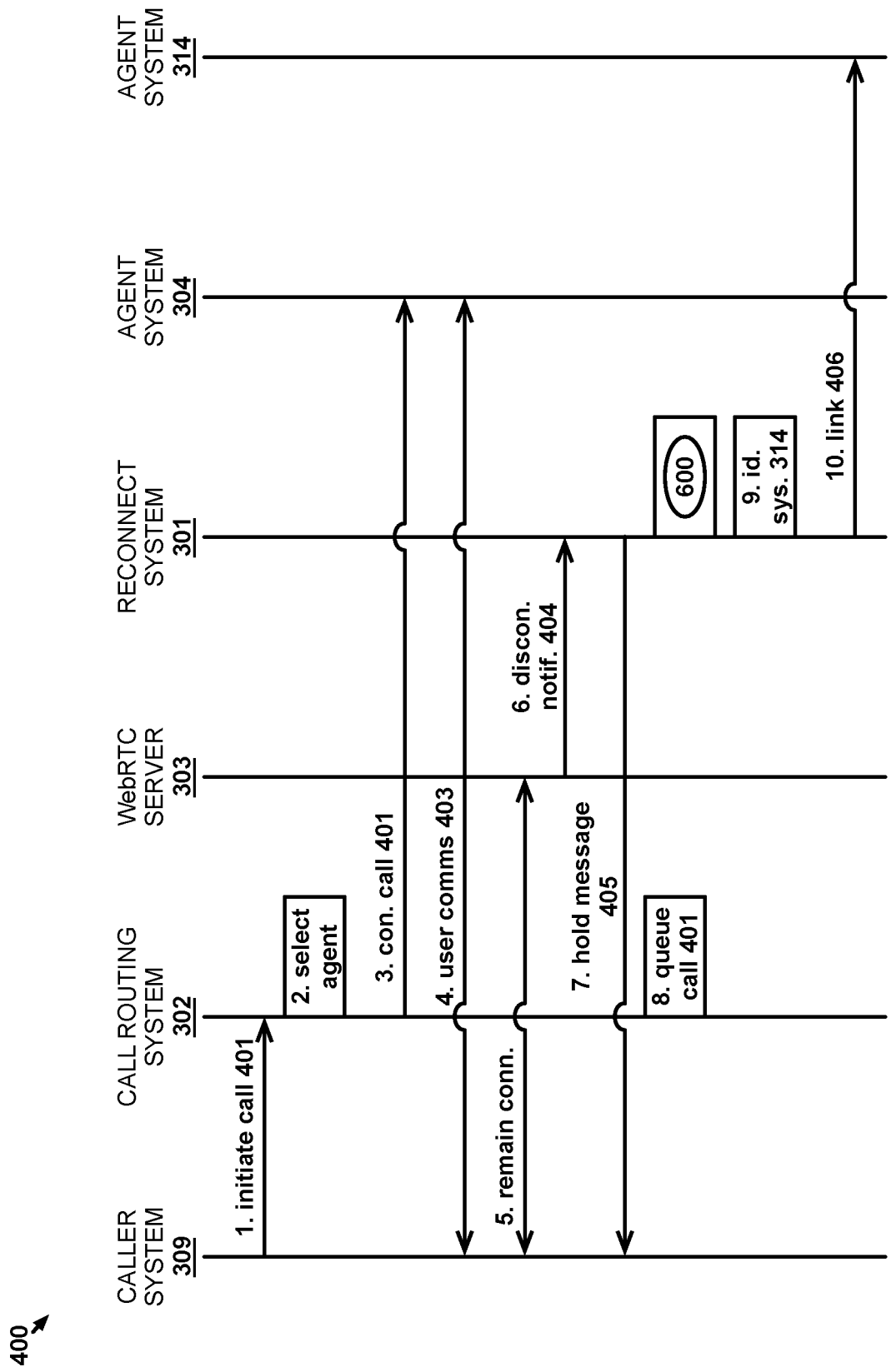
FIG. 4 illustrates an operational scenario to immediately reconnect a call to the same agent in a contact center.

FIG. 4 illustrates operational scenario 400 to immediately reconnect a call to a same agent in a contact center. In operational scenario 400, caller client system 309 initiates call 401 to call routing system 302 at step 1 for caller client system 309's user, the caller, to speak with an agent over a voice WebRTC communication session. For example, the user of caller client system 309 may be browsing a website of a company associated with contact center 311 and may select a link in the website that initiates call 401 using WebRTC to an agent at contact center 311. Other manners of initiating a call may also be used, including those where call routing system 302 initiates call 401 to caller client system 309.

Responsive to caller client system 309 initiating call 401, call routing system 302 selects an agent that should handle call 401 at step 2 so that the call can be routed to the agent client system operated by that agent. In some cases, call 401 may be placed in a queue until an agent is available. In this example, the agent operating agent client system 304 is selected. The agent operating agent client system 304 may be selected after call routing system 302 receives information from caller client system 309 about a reason for the call. For example, the information may indicate that the caller has a particular issue (such as a technical problem) that they need help with or are calling for information about a particular product before purchasing that product. Contact center 311 may include agents trained to handle any number of issues. An IVR system of contact center 311, a web interface, or some other type of query mechanism may be employed by call routing system 302 to obtain information about the call from the caller.

Call routing system 302 then instructs WebRTC server 303 to establish a WebRTC call at step 3 between agent client system 304 and caller client system 309. Real-time user communications 403, voice in this case, are then exchanged at step 4 between caller client system 309 and agent client system 304. In particular, user communications 403 are exchanged on a connection between caller client system 309 and WebRTC server 303 and a separate connection between agent client system 304 and WebRTC server 303. Ideally, the exchange of user communications will simply continue until either the user of caller client system 309 or the agent of agent client system 304 instruct their respective clients otherwise. However, in this situation, a non-recoverable error occurs that causes agent client system 304 to disconnect from WebRTC server 303 at step 5 during the exchange of user communications while caller client system 309 remains connected to WebRTC server 303.

Once WebRTC server 303 recognizes that a non-recoverable error occurred to disconnect agent client system 304 from WebRTC server 303, WebRTC server 303 transfers disconnect notification 404 at step 6 to reconnect system 301 so that reconnect system 301 can begin the process of immediately reconnecting the agent to the WebRTC call. In this example, when reconnect system 301 receives disconnect notification 404, reconnect system 301 transfers hold message 405 to caller client system 309 at step 7 for presentation to the caller by caller client system 309. For instance, hold message 405 may be an audio message notifying caller client system 309 that the agent has been disconnected and is in the process of being reconnected. Hold message 405 may be beneficial because, though described as being an immediate reconnection herein, the inherent time it takes to reconnect the agent may be enough for the caller to think they will have to disconnect themselves. In addition to transferring hold message 405, reconnect system 301 places call 401 in a queue at step 8 to wait for the agent to be reconnected. The queue is a priority queue that gives call 401 priority for being connected to the agent when the agent is reconnected. The priority queue essentially ensures that no other call gets routed to the agent before call 401 when the agent logs back into contact center 311's systems.

Reconnect system 301's process to reconnect the agent to call 401 with the caller includes reconnect system 301 performing in accordance with operational scenario 600 (discussed in detail below) to generate link 406, which will allow the agent to reconnect to the call. Link 406 includes a key unique to the agent and a caller ID as identification information that will be used to reconnect the caller to the agent. Reconnect system 301 identifies at step 9 one or more systems associated with the agent to which link 406 should be sent. In this example, agent client system 314 is identified by reconnect system 301 and, once at least agent client system 314 is identified, reconnect system 301 transfers link 406 at step 10 to agent client system 314. Agent client system 314 may be identified as being associated with the agent in a database maintained by reconnect system 301 or otherwise accessible by reconnect system 301. In some examples, agent client system 314 may be explicitly identified or contact information to which link 406 should be sent (e.g., email address, instant message handle, etc.) may be used for identification. In the latter case, agent client system 314 is a system that is capable of receiving information sent based on the contact information. Agent client system 314 communicates via Internet 310 in this example to illustrate how an agent client system does not need to be connected to contact center 311 directly in order to perform as described herein, although agent client system 314 could certainly be connected to contact center 311 directly in other examples. For instance, even if physically located within contact center 311, agent client system 314 may not be allowed to access contact center network 308 directly. Rather, agent client system 314 may connect to Internet 310 via another network, such as a cellular data network, that in turn communicates with contact center network 308.

Figure 5:
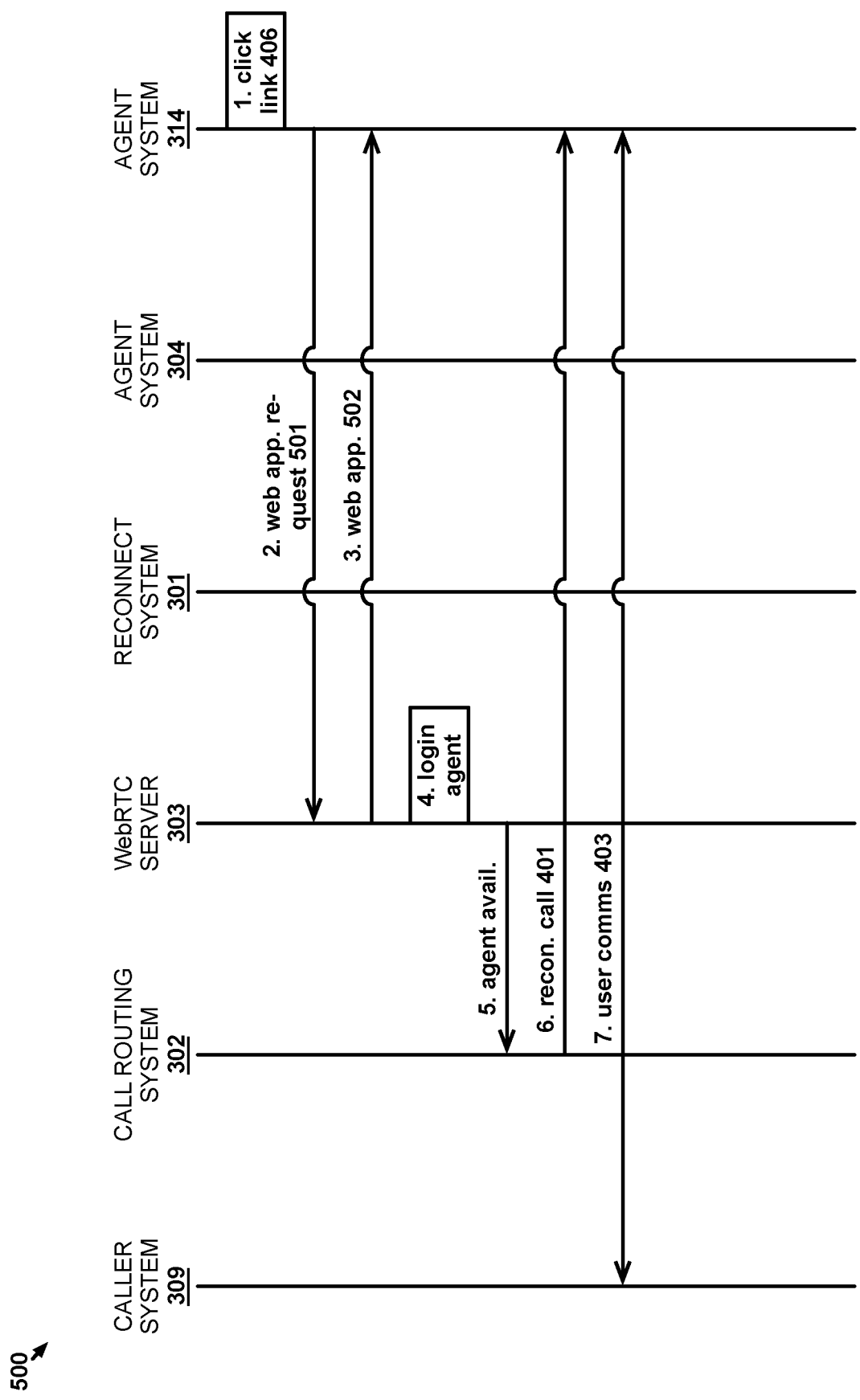
FIG. 5 illustrates another operational scenario to immediately reconnect a call to the same agent in a contact center.

FIG. 5 illustrates operational scenario 500 to immediately reconnect a call to a same agent in a contact center. Operational scenario 500 is a continuation of operational scenario 400 after link 406 is transferred to agent client system 314. After agent client system 314 receives link 406, the agent clicks on, or otherwise selects link 406, at step 1 to direct agent client system 314 to follow link 406. For example, the agent may receive a notification on agent client system 314 that a message containing link 406 has been received and directs agent client system 314 to open that message in an application configured to open such messages (e.g., an email message would be opened in an email application). Once open, the agent is able to select link 406. In this example, selection of link 406 causes agent client system 314 to open a web browser to follow link 406 as the web browser would any other link input thereto.

As with most web links, when agent client system 314 follows link 406, agent client system 314 transfers a request for information from a system to which link 406 directs. While not shown, agent client system 314 may communicate with a domain name system (DNS) to obtain a network address to which requests should be sent if link 406 uses a domain name rather than the network address. In this example, link 406 directs to WebRTC server 303 at step 2 and WebRTC server 303 recognizes a request based on link 406 as being web application request 501, which requests web application 502. Upon receiving web application request 501, WebRTC server 303 also provides web application 502 to agent client system 314 at step 3 in response to web application request 501. WebRTC server 303 may provide web application 502 directly to agent client system 314 or may provide web application 502 by directing agent client system 314 to another system that transfers web application 502. Web application 502 is a WebRTC client program that executes in the browser of agent client system 314 and at least allows the agent to exchange user communications with the caller. Web application 502 may include additional features for handling a call, such as a caller profile viewer, an order submission component, a tech support guide component, a service ticket generator, or some other software component that may be useful when handling a call with contact center 311. Those additional features may require agent client system 314 communicate with systems of contact center 311 other than WebRTC server 303 and web application 502 will provide those features with that capability. In one example, the customer ID included in link 406 is used by web application 502 to retrieve information about the caller in a caller information database (e.g., accesses customer profile information corresponding to the customer ID). WebRTC server 303 identifies the agent based on the key in link 406.

Once web application 502 is executing on agent client system 314, web application 502 logs the agent into WebRTC server 303 at step 4. Web application 502 may be preprogrammed with the identity of the agent as determined by WebRTC server 303 so that web application 502 already know which agent to log into WebRTC server 303. Alternatively, web application 502 may use the key when logging into WebRTC server 303 and WebRTC server 303 may use that key to determine on behalf of which agent web application 502 is logging into WebRTC server 303. In other examples where link 406 directs to a system of contact center 311 other than WebRTC server 303, that other system may identify the agent based on the key and log the identified agent into WebRTC server 303. In this example, WebRTC server 303 presumes that agent client system 314 is following link 406 at the request of the identified agent since reconnect system 301 included the agent's key in link 406 and sent link 406 to agent client system 314. That presumption is what allows WebRTC server 303 to bypass its usual agent login procedure with respect to web application 502 by presuming that the agent is the one who is operating agent client system 314. In some cases, WebRTC server 303 may further rely on agent client system 314 having its own access security for the agent to ensure someone other than the agent is unable to follow link 406.

Once web application 502 is running on agent client system 314 and the agent is logged into WebRTC server 303, WebRTC server 303 notifies call routing system 302 at step 5 that the agent is available for handling calls. Since call 401 is currently waiting in a priority queue for the agent, call 401 is taken out of that queue in response to call routing system 302 receiving notification that the agent is now available. Call routing system 302 then instructs WebRTC server 303 to reconnect the WebRTC call for call 401 at step 6 between agent client system 314 and caller client system 309. Once call 401 is reconnected, user communications 403 continue to be exchanged at step 7 between the caller and the agent. While the caller continues to exchange user communications 403 using caller client system 309, the agent now exchanges user communications 403 using agent client system 314, which is unbeknown to the caller.

Figure 6:
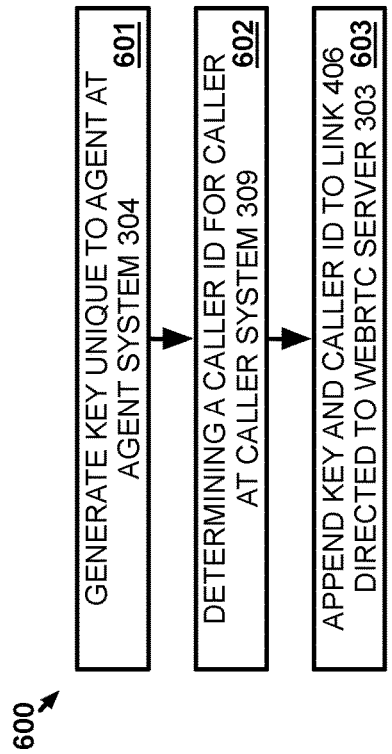
FIG. 6 illustrates a further operational scenario to immediately reconnect a call to the same agent in a contact center.

FIG. 6 illustrates operational scenario 600 to immediately reconnect a call to a same agent in a contact center. Operational scenario 600 is an example for generating the identification information for the call within link 406. Reconnect system 301 generates a key unique to the agent of agent client system 304 (601). The key may be generated from an agent ID, agent age, agent language, agent gender, or some other information descriptive of the agent—including combinations thereof. In some examples, the key may be self-descriptive in that the key itself identifies the agent (and possibly provides other information about the agent) to WebRTC server 303 in operational scenario 400 while, in other examples, WebRTC server 303 may to use the key as a reference to identify the agent. In examples of the latter arrangement, the descriptive information about the agent may be input into a transform, such as a hash function, and the output of that transform is the key. Since such transforms are not typically able to be reversed to identify the originally input information, WebRTC server 303 would use the key as a reference to identify the agent. In some examples, WebRTC server 303 may query reconnect system 301 with the key after receiving the key to identify the agent associated with the key or reconnect system 301 may proactively notify WebRTC server 303 of the agent associated with the key before WebRTC server 303 receives web application request 501 with the key from agent client system 314.

Reconnect system 301 also determines a caller ID for the caller at caller client system 309 (602). The caller ID may identify the caller specifically or may identify the system from which the caller is calling (i.e., caller client system 309). The caller ID may be generated after agent client system 304 disconnects from call 401 for the purposes of reconnecting call 401, may be generated when call 401 is initiated or established, may be generated prior to call 401 (e.g., the caller may have called previously), or may be generated at some other time. The caller ID may be generated by reconnect system 301 or by some other system of contact center 311, including one that may not be shown in implementation 300.

Reconnect system 301 appends the key and the caller ID to the rest of link 406 that directs to WebRTC server 303 (603). When WebRTC server 303 receives web application request 501, the key and the caller ID are included in that request. WebRTC server 303 uses the key to identify the agent and log them into WebRTC server 303 (e.g., step 3 of operational scenario 500). WebRTC server 303 may use the caller ID to identify the caller at caller client system 309 to ensure the correct call get reconnected to agent client system 314, may use the caller ID to retrieve and provide caller information (possibly including information about a transaction that was interrupted by the disconnect) to web application 502, or may be used for some other purpose.

Figure 7:
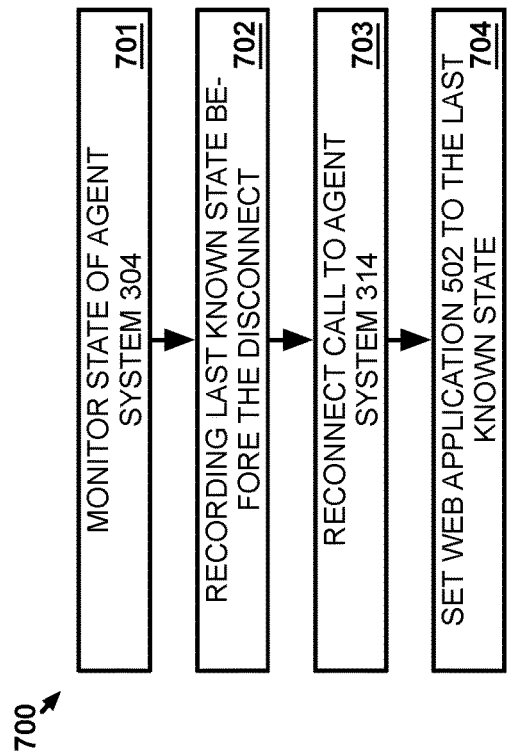
FIG. 7 illustrates yet another operational scenario to immediately reconnect a call to the same agent in a contact center.

FIG. 7 illustrates operational scenario 700 to immediately reconnect a call to a same agent in a contact center. Operational scenario 700 occurs concurrently with operational scenario 400 and operational scenario 500. Before agent client system 304 disconnects from call 401, reconnect system 301 monitors the state of agent client system 304 (701). The state may include which applications are in use on agent client system 304 and a state of those applications (e.g., which section of an application is currently in use and what input has been applied). Monitoring the state of agent client system 304 allows reconnect system 301 to record the last known state of agent client system 304 before agent client system 304 disconnects from WebRTC server 303 (702). WebRTC server 303 reconnects call 401 to agent client system 314 in accordance with operational scenario 400 and operational scenario 500 after the disconnect (703). Since reconnect system 301 recorded the last known state of agent client system 304, reconnect system 301 sets the state of web application 502 to the last known state of agent client system 304 (704). In some examples, web application 502 may have less capability than agent client system 304 and reconnect system 301 may only be able to set a subset of the last know state. For example, web application 502 may not support a trouble ticket application from agent client system 314 but does support a customer profile viewer. Reconnect system 301 would, therefore, not be able to set the state of a trouble ticket component of web application 502 but will be able to set the customer profile viewer to a profile of the caller (assuming a profile of the caller was part of the last known state). In other examples, agent client system 314 may be a client system that runs one or more contact center applications natively, like agent client system 304, rather than requiring a web application 502. In those examples, the applications on agent client system 314 can be set to the last known state of the corresponding applications on agent client system 304 rather than that state needing to be converted by reconnect system 301 to a format compatible with web application 502, as may be needed in the example above.

Figure 8:
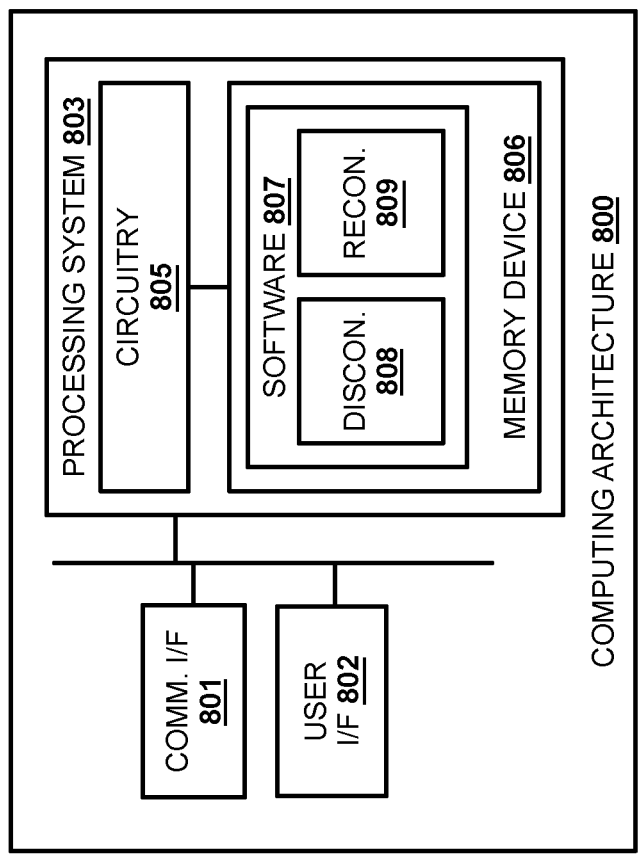
FIG. 8 illustrates a computing architecture for immediately reconnecting a call to the same agent in a contact center.

FIG. 8 illustrates computing architecture 800 for immediately reconnecting a call to a same agent in a contact center. Computing architecture 800 is an example computing architecture for reconnect system 101 and reconnect system 301, although systems 101 and 301 may use alternative configurations. A similar architecture may also be used for other systems described herein, although alternative configurations may also be used. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a storage medium, such as a disk drive, flash drive, data storage circuitry, or some other memory apparatus. In no examples would a storage medium of memory device 806 be considered a propagated signal. Operating software 807 comprises computer programs, firmware, or some other form of machine-readable processing instructions. Operating software 807 includes disconnect determination module 808 and reconnect module 809. Operating software 807 may further include an operating system, utilities, drivers, network interfaces, applications, or some other type of software. When executed by processing circuitry 805, operating software 807 directs processing system 803 to operate computing architecture 800 as described herein.

In particular, disconnect determination module 808 directs processing system 803 to determine that a first agent system, operated by a first agent of a plurality of agents for the contact center, has been disconnected from a communication session between the first agent system and a first caller system, operated by a first caller, due to a non-recoverable error, wherein the first caller system remains connected to the contact center. Reconnect module 809 directs processing system 803 to generate identification information that identifies the communication session and generate a link to join the communication session. The link includes the identification information. Reconnect module 809 further directs processing system 803 to transfer the link to a second agent system operated by the first agent. The second agent system is connected to the communication session when the second agent system follows the link.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for reconnecting a call to an agent of a contact center, the method comprising:

determining that a first agent system, operated by a first agent of a plurality of agents for the contact center, has been disconnected from a communication session between the first agent system and a first caller system, operated by a first caller, due to a non-recoverable error, wherein a connection is established between the first caller system and the contact center for the communication session, and wherein the connection remains after the first agent system disconnects from the communication session;

generating identification information that identifies the communication session;

generating a link to join the communication session, wherein the link includes the identification information; and transferring the link to a second agent system operated by the first agent, wherein the second agent system is connected to the communication session when the second agent system follows the link.

2. The method of claim 1, wherein the identification information includes a key that is unique to the first agent and a caller identifier that identifies the first caller.

3. The method of claim 1, wherein determining that the first agent system has been disconnected comprises:

receiving a disconnect notification from a communication server that was facilitating the communication session.

4. The method of claim 1, further comprising:

receiving a request from the second agent system in response to the second agent system following the link, wherein the request includes the identification information; and based on the identification information, bypassing an agent login process.

5. The method of claim 1, further comprising:

receiving a request from the second agent system in response to the second agent system following the link, wherein the request includes the identification information; and providing the second agent system with a web application interface to continue the communication session.

6. The method of claim 5, further comprising:

after providing the web application interface, registering the second agent system with a communication server for facilitating the communication session and notifying a communication routing system that the first agent is available, wherein the communication routing system connects the first caller system to the second agent system via the communication server.

7. The method of claim 5, further comprising:

recording a state of the first agent system prior to being disconnected from the communication session; and setting the web application interface to the state.

8. The method of claim 1, wherein determining that the first agent system has been disconnected comprises:

receiving a disconnect notification message from a communication server that was facilitating the communication session, wherein the disconnect notification message indicates the first agent system disconnected due to a recoverable error; and upon the first agent system not recovering within a predetermined period of time, determining that the first agent system has been disconnected due to a non-recoverable error.

9. The method of claim 1, further comprising:

after determining that the first agent system has been disconnected from the communication session, presenting a message to the first caller indicating that reconnection of the first agent is being attempted.

10. An apparatus for reconnecting a call to an agent of a contact center, the apparatus comprising:

one or more computer readable storage media;

a processing system operatively coupled with the one or more computer readable storage media; and program instructions stored on the one or more computer readable storage media that, when read and executed by the processing system, direct the processing system to:

determine that a first agent system, operated by a first agent of a plurality of agents for the contact center, has been disconnected from a communication session between the first agent system and a first caller system, operated by a first caller, due to a non-recoverable error, wherein a connection is established between the first caller system and the contact center for the communication session, and wherein the connection remains after the first agent system disconnects from the communication session;

generate identification information that identifies the communication session;

generate a link to join the communication session, wherein the link includes the identification information; and transfer the link to a second agent system operated by the first agent, wherein the second agent system is connected to the communication session when the second agent system follows the link.

11. The apparatus of claim 10, wherein the identification information includes a key that is unique to the first agent and a caller identifier that identifies the first caller.

12. The apparatus of claim 10, wherein to determine that the first agent system has been disconnected, the program instructions direct the processing system to:

receive a disconnect notification from a communication server that was facilitating the communication session.

13. The apparatus of claim 10, wherein the program instructions further direct the processing system to:

record a state of the first agent system prior to being disconnected from the communication session; and set a web application interface in the second agent system to the state.

14. The apparatus of claim 10, wherein to determine that the first agent system has been disconnected, the program instructions direct the processing system to:

receive a disconnect notification message from a communication server that was facilitating the communication session, wherein the disconnect notification message indicates the first agent system disconnected due to a recoverable error; and upon the first agent system not recovering within a predetermined period of time, determine that the first agent system has been disconnected due to a non-recoverable error.

15. The apparatus of claim 10, wherein the program instructions further direct the processing system to:

after determining that the first agent system has been disconnected from the communication session, present a message to the first caller indicating that reconnection of the first agent is being attempted.

16. An apparatus for reconnecting a call to an agent of a contact center, the apparatus comprising:

one or more computer readable storage media;

a processing system operatively coupled with the one or more computer readable storage media; and program instructions stored on the one or more computer readable storage media that, when read and executed by the processing system, direct the processing system to:

facilitate a communication session between a first agent system, operated by a first agent of a plurality of agents for the contact center, and a first caller system, operated by a first caller;

determine that a first agent system has been disconnected from the communication session due to a non-recoverable error, wherein a connection is established between the first caller system and the contact center for the communication session, and wherein the connection remains after the first agent system disconnects from the communication session;

notify a reconnect system that the first agent system has been disconnected, wherein the reconnect system generates a link to join the communication session that includes identification information that identifies the communication session and transfers the link to a second agent system operated by the first agent; and connect the second agent system to the communication session when the second agent system follows the link.

17. The apparatus of claim 16, wherein the identification information includes a key that is unique to the first agent and a caller identifier that identifies the first caller.

18. The apparatus of claim 16, wherein to connect the second agent system to the communication session, the program instructions direct the processing system to:

receive a request from the second agent system in response to the second agent system following the link, wherein the request includes the identification information; and based on the identification information, bypass an agent login process.

19. The apparatus of claim 16, wherein to connect the second agent system to the communication session, the program instructions direct the processing system to:

receive a request from the second agent system in response to the second agent system following the link, wherein the request includes the identification information; and provide the second agent system with a web application interface to continue the communication session.

20. The apparatus of claim 19, wherein the program instructions further direct the processing system to:

after providing the web application interface, register the second agent system with a communication server for facilitating the communication session and notifying a communication routing system that the first agent is available, wherein the communication routing system connects the first caller system to the second agent system via the communication server.

* * * * *